United States Patent
Brozek

(10) Patent No.: US 10,270,263 B2
(45) Date of Patent: Apr. 23, 2019

(54) SYSTEM AND METHOD FOR CHARGING A BATTERY PACK

(71) Applicant: MILWAUKEE ELECTRIC TOOL CORPORATION, Brookfield, WI (US)

(72) Inventor: Jeffrey M. Brozek, Mequon, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 18 days.

(21) Appl. No.: 15/465,211

(22) Filed: Mar. 21, 2017

(65) Prior Publication Data

US 2017/0271893 A1 Sep. 21, 2017

Related U.S. Application Data

(60) Provisional application No. 62/311,179, filed on Mar. 21, 2016.

(51) Int. Cl.
| | |
|---|---|
| H02J 7/04 | (2006.01) |
| H02J 7/16 | (2006.01) |
| H02J 7/00 | (2006.01) |

(52) U.S. Cl.
CPC ............ *H02J 7/0021* (2013.01); *H02J 7/007* (2013.01); *H02J 7/0011* (2013.01); *H02J 7/0031* (2013.01); *H02J 7/0044* (2013.01); *H02J 7/0073* (2013.01); *H02J 7/0088* (2013.01); *H02J 7/0004* (2013.01); *H02J 2007/0001* (2013.01); *H02J 2007/0096* (2013.01)

(58) Field of Classification Search
CPC ..................................................... H02J 7/0021
USPC .................................................. 320/112, 155
See application file for complete search history.

(56) References Cited

U.S. PATENT DOCUMENTS

| | | | |
|---|---|---|---|
| 2005/0052159 A1* | 3/2005 | Moore | H02J 7/0031 320/134 |
| 2012/0098500 A1* | 4/2012 | Vestama | H01M 10/44 320/149 |
| 2012/0206086 A1 | 8/2012 | Yagi | |

OTHER PUBLICATIONS

European Search Report for Application No. 17162126.1 dated Aug. 9, 2017 (7 pages).
Taiwan Patent Office Action and Search Report for Application No. 106109392 dated Dec. 21, 2017, 8 pages.

* cited by examiner

*Primary Examiner* — Edward Tso
*Assistant Examiner* — Ahmed H Omar
(74) *Attorney, Agent, or Firm* — Michael Best & Friedrich LLP

(57) ABSTRACT

System and method for charging a battery pack. One system includes a battery pack with at least one battery cell, a memory, and a charging circuit configured to control a charging current from a charger to the battery pack. The battery pack also includes an electronic processor configured to control the charging circuit and to determine a type of charger to which the battery pack is connected. The electronic processor is further configured to determine, based on the type of charger, a disconnect time and to control the charging circuit to allow the charging current to charge the battery pack. The electronic processor is further configured to control the charging circuit to electrically disconnect the battery pack from the charger after the disconnect time elapses and to control the charging circuit to electrically reconnect the battery pack and the charger after disconnecting the battery pack from the charger.

21 Claims, 3 Drawing Sheets

SYSTEM AND METHOD FOR CHARGING A BATTERY PACK

RELATED APPLICATIONS

This application claims priority to U.S. Provisional Patent Application No. 62/311,179, filed on Mar. 21, 2016, the entire contents of which are hereby incorporated by reference.

FIELD OF THE INVENTION

The present invention relates to battery packs and battery chargers used to charge the battery packs.

SUMMARY

In one embodiment, a battery pack is provided. The battery pack includes at least one battery cell, a memory, and a charging circuit electrically connected to the at least one battery cell and configured to control a charging current from a charger to the at least one battery cell. The battery pack also includes an electronic processor configured to control the charging circuit. The electronic processor is further configured to determine a type of charger to which the battery pack is connected. The electronic processor is further configured to determine, based on the type of charger, a disconnect time. The electronic processor is further configured to control the charging circuit to allow the charging current to charge the at least one battery cell. The electronic processor is further configured to control the charging circuit to electrically disconnect the at least one battery cell from the charger after the disconnect time elapses. The electronic processor is further configured to control the charging circuit to electrically reconnect the at least one battery cell and the charger after disconnecting the at least one battery cell from the charger.

In another embodiment, a method of charging a battery pack is provided. The battery pack includes a charging circuit electrically connected to at least one battery cell of the battery pack and configured to control a charging current from a charger to the at least one battery cell. The method includes determining, with an electronic processor of the battery pack, a type of charger to which the battery pack is connected. The method further includes determining, with the electronic processor based on the type of charger, a disconnect time. The method further includes controlling, with the electronic processor, the charging circuit of the battery pack to allow the charging current from the charger to charge the at least one battery cell. The method further includes controlling, with the electronic processor, the charging circuit to electrically disconnect the at least one battery cell from the charger after the disconnect time elapses. The method further includes controlling, with the electronic processor, the charging circuit to electrically reconnect the at least one battery cell and the charger after disconnecting the at least one battery cell from the charger.

In yet another embodiment, a battery pack is provided. The battery pack includes at least one battery cell, a memory, and a charging circuit electrically connected to the at least one battery cell and configured to control a charging current from a charger. The battery pack further includes an electronic processor configured to control the charging circuit. The electronic processor is configured to determine a disconnect time. The electronic processor is further configured to control the charging circuit to allow the charging current to charge the at least one battery cell. The electronic processor is further configured to control the charging circuit to electrically disconnect the at least one battery cell from the charger after the disconnect time elapses. The electronic processor is further configured to control the charging circuit to electrically reconnect the battery pack and the charger after disconnecting the battery pack from the charger.

DETAILED DESCRIPTION

Figure 1:
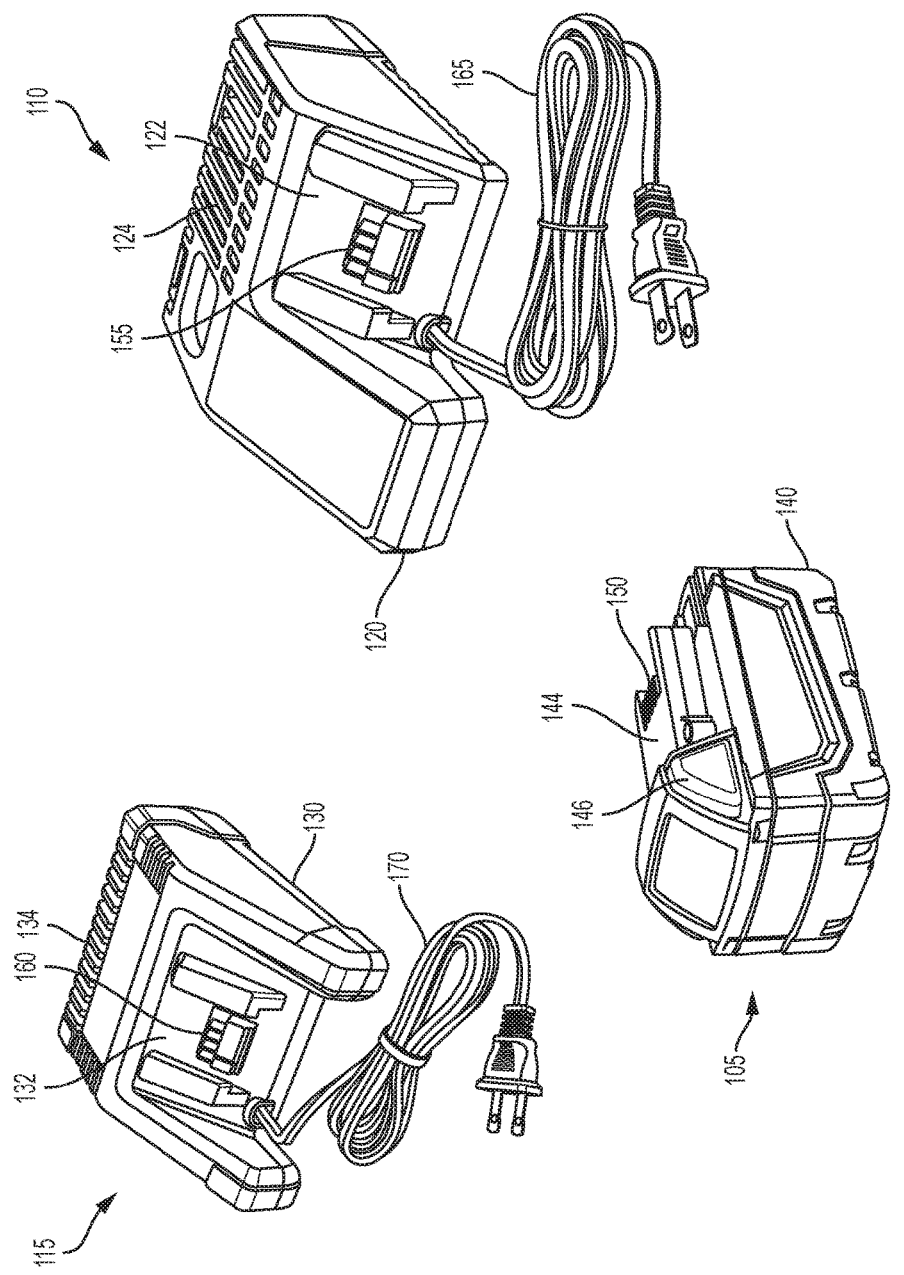
FIG. 1 illustrates a battery pack, a first charger, and a second charger according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect.

Additionally, a plurality of hardware and software based devices, as well as a plurality of different structural components, may be utilized to implement the invention. Furthermore, and as described in subsequent paragraphs, the specific configurations illustrated in the drawings are intended to exemplify embodiments of the invention and that other alternative configurations are possible. The terms "processor" "central processing unit" and "CPU" are interchangeable unless otherwise stated. Where the terms "processor" or "central processing unit" or "CPU" are used as identifying a unit performing specific functions, it should be understood that, unless otherwise stated, those functions can be carried out by a single processor, or multiple processors arranged in any form, including parallel processors, serial processors, tandem processors or cloud processing/cloud computing configurations.

FIG. 1 illustrates a battery pack 105, a first charger 110, and a second charger 115. The battery pack 105 can be used to provide power to power tools including, but not limited to, an impact driver, a power drill, a hammer drill, a reciprocating saw, a pipe cutter, a sander, a nailer, and a grease gun. Such power tools may include a battery receptacle that slidably receives the battery pack 105. The first charger 110 includes a first charger housing 120 and a first battery receptacle 122. The first charger housing 120 includes at least one vent 124 that allows for cooling air flow to be provided to internal charging circuitry of the first charger 110. The second charger 115 includes a second charger housing 130 and a second battery receptacle 132. The second charger housing 130 includes at least one vent 134 that allows for cooling air flow to be provided to internal charging circuitry of the second charger 115.

The battery pack 105 includes a housing 140 and a plurality of rechargeable battery cells 142 (not shown in FIG. 1). The battery pack 105 also includes a support portion 144 for securing the battery pack 105 within the battery receptacle of a power tool, within the first battery receptacle 122, or within the second battery receptacle 132. The battery pack 105 further includes a locking mechanism 146 for selectively locking the battery pack 105 to the battery receptacle of a power tool, to the first battery receptacle 122, or to the second battery receptacle 132. The battery pack 105 can be electrically coupled to a power tool or the chargers 110 or 115 through battery pack terminals 150. The battery pack terminals 150 include a power line, a ground line, and one more communication lines. When coupled to the first charger 110, first charger terminals 155 receive and are electrically coupled to the battery pack terminals 150. When coupled to the second charger 115, second charger terminals 160 receive and are electrically coupled to the battery pack terminals 150. The first charger 110 and the second charger 115 respectively include power cords 165 and 170 that provide electrical power to the chargers 110 and 115, respectively, to charge the battery pack 105.

The chargers 110 and 115 are merely exemplary and are of a different type. For example, the first charger 110 may be a rapid charger that is capable of charging the battery pack 105 more quickly than the second charger 115. For example, the first charger 110 may provide a higher charging current than the second charger 115. Accordingly, the second charger 115 may be a standard charger that charges the battery pack 105 more slowly than the first charger 110. Additionally, the second charger 115 may be configured to stop charging a battery pack after a predetermined time period as will be explained in greater detail below. Furthermore, the chargers 110 and 115 are capable of charging different types of battery packs that may take different amounts of time to complete charging. The battery pack 105 is merely exemplary and may be any battery pack that the chargers 110 and 115 are capable of charging.

Figure 2:
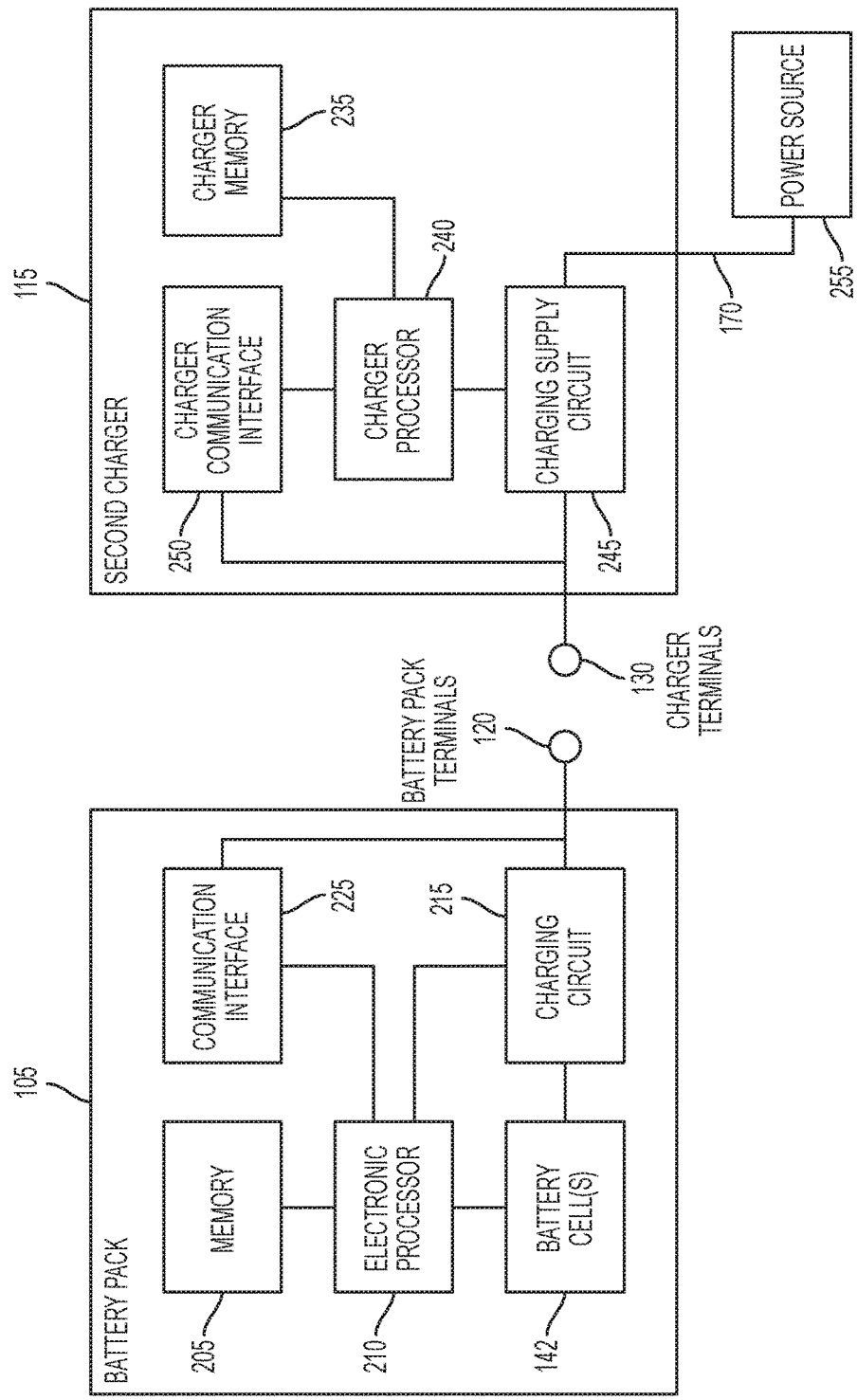
FIG. 2 illustrates a block diagram of the battery pack and the second charger according to some embodiments.

FIG. 2 illustrates a block diagram of the battery pack 105 and the second charger 115 according to one embodiment. The battery pack 105 includes a memory 205 and an electronic processor 210. The electronic processor 210 is communicatively coupled to the memory 205 which stores data and instructions that are executable by the electronic processor 210 to control the operation of the battery pack 105. The memory 205 includes one or more non-transitory computer-readable memory devices such as, for example, random access memory (RAM), read only memory (ROM), Flash memory, and/or optical/magnetic disk storage.

The battery pack 105 further includes a charging circuit 215 and one or more rechargeable battery cells 142. Each battery cell 142 has a chemistry and a nominal voltage. For example, in some embodiments, the battery pack 105 has a battery chemistry of Lithium-ion or Nickel-cadmium and a nominal voltage of approximately 18 Volts, 12 Volts, 28 Volts, or 20 Volts. In some embodiments, the term approximately represents values within five percent of the stated value. In other embodiments, the term approximately represents values within ten percent of the stated value. The battery cells 142 are coupled to the charging circuit 215, which controls charging of the battery cells 142 when the battery pack 105 is coupled to a charger 110 or 115. More specifically, the electronic processor 210 can enable or disable the charging circuit 215 to allow the battery cells 142 to be charged and to prevent the battery cells 142 from being charged, respectively. For example, the charging circuit 215 may include one or more power switching elements (e.g., a field effect transistor (FET) or other transistor) that can be controlled to make and break connections between the battery cells 142 and the battery pack terminals 120. The battery cells 142 may also be coupled to the electronic processor 210 through sensors that allow the electronic processor 210 to monitor characteristics of the battery cells 142 (e.g., temperature, charge status, etc.). The electronic processor 210, in turn, may control the charging circuit 215 based in part on the monitored characteristics of the battery cells 142.

The battery pack 105 also includes a communication interface 225 used for communications from the chargers 110 or 115 to the battery pack 105, from the battery pack 105 to the chargers 110 or 115, or both. The electronic processor 210 is coupled to the communication interface 225 and sends/receives communication to/from the chargers 110 or 115 via the communication interface 225. Based on this communication, the electronic processor 210 can determine whether the battery pack 105 is coupled to the first charger 110 (i.e., a rapid charger) or the second charger 115 (i.e., a standard charger). For example, the communication may include a charger identifier that identifies the type of charger. Alternatively, the electronic processor 210 monitors the battery pack terminals 150 and recognizes a charging signature of the charger 110 or 115 to determine whether the battery pack 105 is coupled to the first charger 110 or the second charger 115 (e.g., a rapid charger may provide a different charging current than a standard charger). For example, the electronic processor 210 may detect a charging power characteristic using a sensor (e.g., current or voltage level of power provided on battery pack terminals 120 from a connected charger), and then access a lookup table (e.g., stored in the memory 205) mapping charging characteristics to charger types. In some embodiments, the battery pack 105 and the first charger 110 may include an additional terminal that the second charger 115 does not include. Accordingly, in such embodiments, the battery pack 105 can recognize the first charger 110 as a rapid charger when the battery pack 105 detects the additional terminal. The battery pack 105 may detect the additional terminal by, for example, receiving a signal from the first charger 110 sent over the additional terminal. Conversely, the battery pack 105 can recognize the second charger 115 as a standard charger when the battery pack 105 does not detect the additional terminal.

FIG. 2 also illustrates the second charger 115 according to one embodiment. The second charger 115 includes a charger memory 235, a charger processor 240 (e.g., an electronic processor), a charging supply circuit 245, and a charger communication interface 250. Similar components of the second charger 115 behave similarly as the corresponding components of the battery pack 105 described above. For example, the charging supply circuit 245 is controlled by the charger processor 240 to be enabled and disabled which respectively allows and disallows charging of the battery pack 105. A power source 255, such as standard 120 V/60 Hz wall outlet, is coupled to the second charger 115 via the power cord 170. The power source 255 provides power to the charging supply circuit 245, which is used to supply power to the battery pack 105 to be charged. The power source 255 also provides power to the other electronic components of the second charger 115.

In some embodiments, the charger processor 240 monitors the second charger terminals 160 to determine when a battery pack (e.g., battery pack 105) is connected to the second charger 115. Furthermore, in some embodiments, the charger processor 240 starts a charger timer when a battery pack is connected to the second charger 115 and enables the charging supply circuit 245 to begin charging the battery pack. After a predetermined period of time, the charger processor 240 disables the charging supply circuit 245 to stop charging the battery pack. Certain battery packs are expected to be fully charged upon expiration of the charger timer, and the charging supply circuit 245 is stopped to prevent overcharging of these battery packs. However, some battery packs (in particular, higher capacity battery packs) take more time to fully charge than the predetermined period of time. Thus, when the predetermined period of time elapses and the charger processor 240 disables the charging supply circuit 245 to stop charging the battery pack, the battery pack might not be fully charged. In some instances, the second charger 115 is configured to detect the type of battery pack coupled to the charger (e.g., high capacity or standard capacity) and adjust the charger timer to an appropriate value to ensure full charging of the coupled battery pack. However, in some instances, the second charger 115 is an existing charger in the field and the predetermined period of time is fixed and set at a level for standard capacity battery packs.

In some embodiments, the first charger 110 is a rapid charger that is not configured to stop charging the battery pack 105 after a predetermined time. Rather, the battery pack 105 may include a timer that is used to indicate when to stop charging instead of the first charger 110 including a timer that is used to indicate when to stop charging. For example, based on a charging current of the first charger 110 and based on the capacity of the battery pack 105, the electronic processor 210 of the battery pack 105 may adjust the timer such that the timer expires when the battery pack 105 is expected to be fully charged.

Accordingly, in some embodiments of the invention, the battery pack 105 is configured to detect when coupled to a charger having a charger timer with a predetermined period of time that does not match the capacity of the battery pack 105 for full charging (e.g., the second charger 115), and to take remedial action to enable full charging. Such configuration provides a backward-compatible battery pack that is compatible with earlier generation chargers. Additionally, the battery pack 105 is configured to detect when coupled to a charger, such as the first charger 110, that does not include a timer that is used to indicate when to stop charging and that, instead, relies on a timer in the battery pack 105 to indicate when to stop charging.

For example, when the battery pack 105 is coupled to the first charger 110, the electronic processor 210 may control the charging circuit 215 in a first manner. When the battery pack 105 is coupled to the second charger 115, the electronic processor 210 may control the charging circuit 215 in a second manner that is different than the first manner. For example, the electronic processor 210 may control the charging circuit 215 to momentarily electrically disconnect from the second charger 115 to prevent the second charger 115 from stopping charging after a predetermined period of time as explained above. Accordingly, the battery pack 105 (in particular, a higher capacity battery pack) is able to fully charge even on the second charger 115 (i.e., a standard charger). In other words, the battery pack 105 is able to fully charge without being mechanically disconnected or removed from the second charger 115. Stated another way, the battery pack 105 remains mechanically connected (i.e., the battery pack terminals 150 and the charger terminals 160 remain engaged to each other) during the entirety of a charging process that allows the battery pack 105 to become fully charged.

Figure 3:
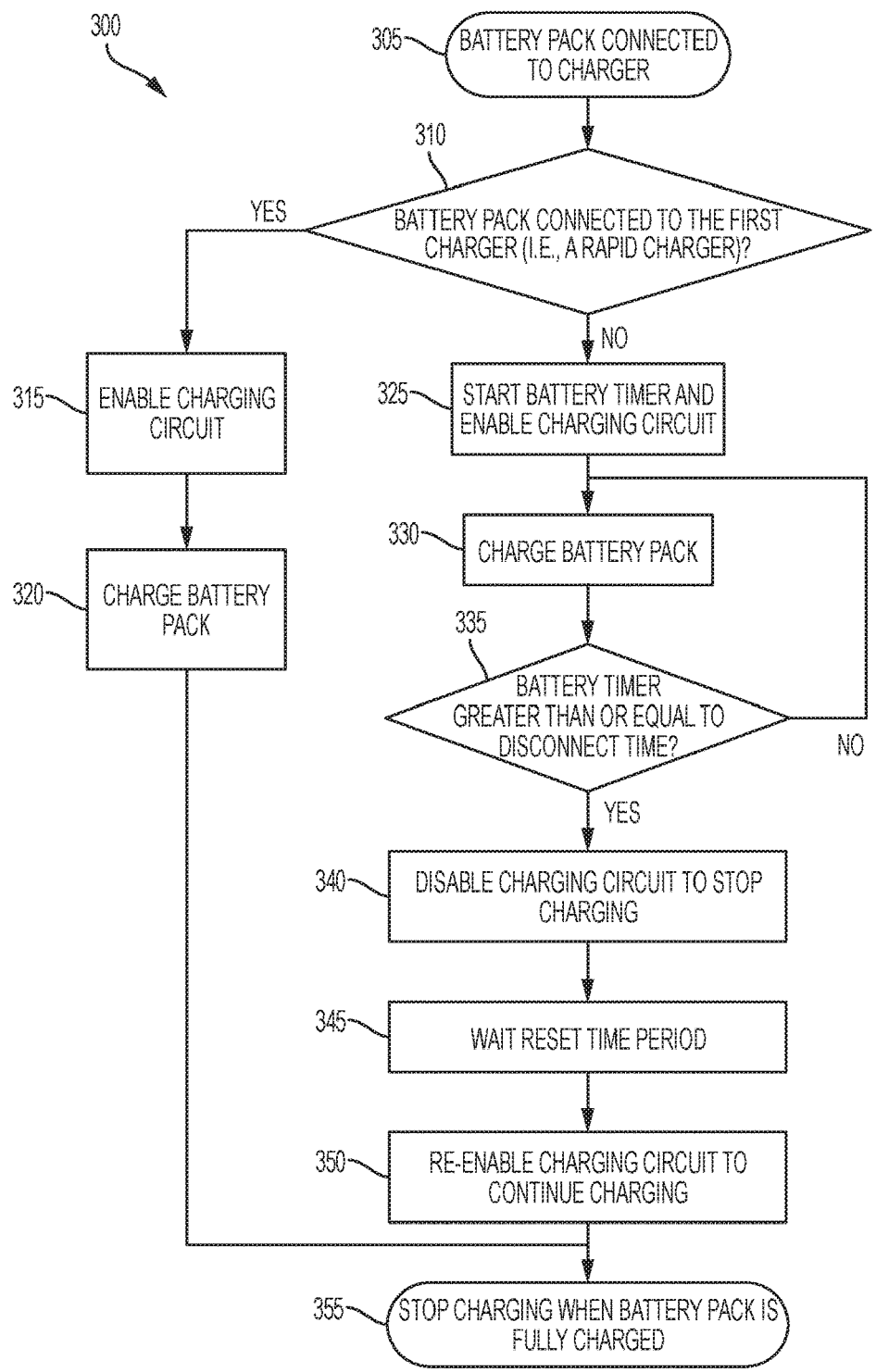
FIG. 3 illustrates a flowchart of a method to control the battery pack when the battery pack is being charged.

FIG. 3 illustrates a flowchart of a method 300 used by the electronic processor 210 to control the charging circuit 215 of the battery pack 105 during charging. At block 305, the battery pack 105 is connected to one of the chargers 110 or 115. At block 310, the electronic processor 210 determines whether the battery pack 105 is connected to the first charger 110 (i.e., a rapid charger). In other words, the electronic processor 210 determines a type of charger to which the battery pack is connected and whether that type of charger will stop charging the battery pack 105 before the battery pack 105 is fully charged as explained previously herein. When the battery pack 105 is connected to the first charger 110 (i.e., a rapid charger), at block 315, the electronic processor 210 enables the charging circuit 215 to allow the battery cells 142 to be charged by the first charger 110. At block 320, the first charger 110 charges the battery pack 105. At block 355, the first charger 110 stops charging the battery pack 105 when the battery pack 105 is fully charged, which may be determined in one or more of the manners described above. For example, the electronic processor 210 may determine that the battery pack 105 is fully charged using a timer in the battery pack 105 as described previously herein, by monitoring a voltage of the battery pack 105, and the like. To stop charging the battery pack 105, the first charger 110 may prevent charging current from being provided to the charging circuit 215 of the battery pack 105, for example, using a charger timer as described above. Alternatively, in some embodiments, the electronic processor 210 of the battery pack 105 may disable the charging circuit 215 or communicate to the first charger 110 that the battery pack 105 is fully charged.

Returning to block 310, when the battery pack 105 is connected to the second charger 115 (i.e., a standard charger), at block 325, the electronic processor 210 starts a battery timer and enables the charging circuit 215 to allow the battery cells 142 to be charged by the second charger 115. In some embodiments, the electronic processor 210 performs additional, optional steps. For example, in some embodiments, the electronic processor 210 determines a disconnect time after which the electronic processor 210 will control the charging circuit 215 to electrically disconnect the second charger 115 from the battery cells 142 as explained below. In some embodiments, the disconnect time is stored in the memory 205 and is not based on the type of charger to which the battery pack is connected. In other embodiments, the electronic processor 210 determines the disconnect time based on the type of charger to which the battery is connected (i.e., based on the battery pack 105 being connected to a standard charger). In some embodiments, the electronic processor 210 determines the disconnect time by retrieving, from the memory 205, a disconnect time corresponding to the type of charger to which the battery pack 105 is connected.

At block 330, the second charger 115 charges the battery pack 105. While the second charger 115 is charging the battery pack 105, at block 335, the electronic processor 210 compares the value of the battery timer to the disconnect time described previously herein. The disconnect time is set to be less than the predetermined period of time used by the second charger 115 to decide when to stop charging. When the value of the battery timer is less than the disconnect time, the method 300 proceeds back to block 330 where the second charger 115 continues charging the battery pack 105. When the value of the battery timer is greater than or equal to the disconnect time, the electronic processor 210 proceeds to block 340 and disables the charging circuit 215 to stop charging of the battery pack 105. At block 345, the method 300 waits a reset time period (e.g., five seconds) and then proceeds to block 350 to re-enable the charging circuit 215 to continue charging the battery pack 105. At block 355, the second charger 115 stops charging when the battery pack 105 is fully charged. In other words, the electronic processor 210 may control the charging circuit 215 to electrically disconnect from and reconnect to the second charger 115 multiple times before the battery pack 105 is fully charged. In some embodiments, at block 330, the electronic processor 210 determines that the battery pack 105 is fully charged and, in response, controls the second charger 115 to stop charging the battery pack 105 (for example, by controlling the charging circuit 215 to electrically disconnect from the second charger 115). In such embodiments, the electronic processor 210 may bypass blocks 340, 345, and 350 when the battery pack 105 is fully charged within the predetermined period of time used by the second charger 115 to decide when to stop charging.

When the charging circuit 215 is disabled (at block 340), the charger processor 240 of the second charger 115 resets the charger timer in the second charger 115 in response to the charger processor 240 detecting that the battery pack 105 was electrically disconnected from the second charger 115. When the charging circuit 215 of the battery pack 105 is re-enabled (at block 350), the second charger 115 begins charging the battery pack 105 again in response to the charger processor 240 detecting that the battery pack 105 has been electrically connected to the second charger 115. The second charger 115 may restart the charger timer and charge the battery pack 105 until the charger timer reaches the predetermined period of time. By momentarily disabling the charging circuit 215 of the battery pack 105, the battery pack 105 is able to charge for longer than the predetermined period of time set by the second charger 115. More particularly, the second charger 115 charges the battery pack 105 for a total charging time equal to the sum of the disconnect time and the predetermined period of time. Accordingly, the battery pack 105 (in particular, a high capacity battery pack) is able to fully charge without being physically removed from the second charger 115. At block 355, the second charger 115 stops charging the battery pack 105 when the battery pack 105 is fully charged, which may be determined using the charger timer as described above. Alternatively, to stop charging, the electronic processor 210 of the battery pack may disable the charging circuit 215 or communicate to the second charger 115 that the battery pack 105 is fully charged.

Thus, the invention provides, among other things, a battery pack that determines what type of charger it is connected to and controls a charging circuit to momentarily electrically disconnect from the charger before a predetermined period of time has elapsed when the battery pack determines that the charger is a certain type of charger.

We claim:

1. A battery pack comprising:
   at least one battery cell;
   a memory;
   a charging circuit electrically connected to the at least one battery cell and configured to control a charging current from a charger to the at least one battery cell; and
   an electronic processor configured to control the charging circuit, wherein the electronic processor is further configured to
     determine a disconnect time,
     control the charging circuit to allow the charging current to charge the at least one battery cell,
     control the charging circuit to electrically disconnect the at least one battery cell from the charger after the disconnect time elapses and before the battery cell is fully charged, and
     control the charging circuit to electrically reconnect the at least one battery cell and the charger after disconnecting the at least one battery cell from the charger.

2. The battery pack of claim 1, wherein the electronic processor is further configured to:
   determine a type of charger to which the battery pack is connected, and
   determine, based on the type of charger, the disconnect time.

3. The battery pack of claim 2, wherein the electronic processor is further configured to determine the type of charger by recognizing a charging signature of the charger.

4. The battery pack of claim 2, wherein the electronic processor is further configured to determine the type of charger by communicating with the charger through a communication interface.

5. The battery pack of claim 2, wherein the electronic processor is further configured to determine, based on the type of charger, that the charger will stop charging the battery pack before the battery pack is fully charged.

6. The battery pack of claim 1, wherein the electronic processor is further configured to wait a reset time period before controlling the charging circuit to electrically reconnect the at least one battery cell and the charger after disconnecting the at least one battery cell from the charger.

7. The battery pack of claim 2, wherein the electronic processor is further configured to determine the disconnect time by retrieving the disconnect time corresponding to the type of charger from the memory.

8. The battery pack of claim 2, wherein the electronic processor is further configured to
   determine when the battery pack is connected to a second charger;
   determine a second type of the second charger; and
   control the charging circuit, based on the second type of the second charger, to remain electrically connected to the second charger until the battery pack is fully charged.

9. The battery pack of claim 1, wherein the battery pack is operable to provide power to a power tool including at least one selected from the group of an impact driver, a power drill, a hammer drill, a reciprocating saw, a pipe cutter, a sander, a nailer, and a grease gun.

10. The battery pack of claim 1, wherein the battery pack has a battery chemistry of Lithium-ion and has a nominal voltage of approximately 18 volts.

11. A method of charging a battery pack, the battery pack including a charging circuit electrically connected to at least one battery cell of the battery pack and configured to control a charging current from a charger to the at least one battery cell, the method comprising:
   determining a disconnect time,
   controlling, with the electronic processor, the charging circuit of the battery pack to allow the charging current from the charger to charge the at least one battery cell,
   controlling, with the electronic processor, the charging circuit to electrically disconnect the at least one battery cell from the charger after the disconnect time elapses and before the battery cell is fully charged, and
   controlling, with the electronic processor, the charging circuit to electrically reconnect the at least one battery cell and the charger after disconnecting the at least one battery cell from the charger.

12. The method of claim 11, further comprising:
    determining, with the electronic processor of the battery pack, a type of charger to which the battery pack is connected, and
    wherein determining the disconnect time includes determining, with the electronic processor, the disconnect time based on the type of charger.

13. The method of claim 12, wherein determining the type of charger includes determining, with the electronic processor, the type of charger by recognizing a charging signature of the charger.

14. The method of claim 12, wherein determining the type of charger includes determining, with the electronic processor, the type of charger by communicating with the charger through a communication interface.

15. The method of claim 12, further comprising determining, with the electronic processor based on the type of charger, that the charger will stop charging the battery pack before the battery pack is fully charged.

16. The method of claim 11, further comprising waiting a reset time period before controlling, with the electronic processor, the charging circuit to electrically reconnect the at least one battery cell and the charger after disconnecting the at least one battery cell from the charger.

17. The method of claim 12, wherein determining the disconnect time includes retrieving the disconnect time corresponding to the type of charger from a memory of the battery pack.

18. The method of claim 12, further comprising:
    determining, with the electronic processor, when the battery pack is connected to a second charger;
    determining, with the electronic processor, a second type of the second charger; and
    controlling, with the electronic processor based on the second type of the second charger, the charging circuit to remain electrically connected to the second charger until the battery pack is fully charged.

19. The method of claim 11, the battery pack being operable to provide power to a power tool including at least one selected from the group of an impact driver, a power drill, a hammer drill, a reciprocating saw, a pipe cutter, a sander, a nailer, and a grease gun.

20. The method of claim 11, the battery pack having a battery chemistry of Lithium-ion and having a nominal voltage of approximately 18 volts.

21. A battery pack comprising:
    at least one battery cell;
    a memory;
    a charging circuit electrically connected to the at least one battery cell and configured to control a charging current from a charger; and
    an electronic processor configured to control the charging circuit, wherein the electronic processor is further configured to
        determine that the charger is of a type that stops charging after a predetermined time period before the battery pack will be fully charged,
        determine a disconnect time, wherein the disconnect time is less than the predetermined time period,
        control the charging circuit to allow the charging current to charge the at least one battery cell,
        control the charging circuit to electrically disconnect the at least one battery cell from the charger after the disconnect time elapses and before the battery cell is fully charged, and
        control the charging circuit to electrically reconnect the battery pack and the charger after disconnecting the battery pack from the charger.

* * * * *